United States Patent
Bergart

(12) Patent No.: US 6,168,102 B1
(45) Date of Patent: Jan. 2, 2001

(54) ROTARY DRUM WASHER

(76) Inventor: David Bergart, 62 Newport Square, Thornhill, Ontario (CA), L4J 7N1

(*) Notice: Under 35 U.S.C. 154(b), the term of this patent shall be extended for 0 days.

(21) Appl. No.: 09/324,509

(22) Filed: Jun. 3, 1999

Related U.S. Application Data

(62) Division of application No. 09/010,033, filed on Jan. 21, 1998, now Pat. No. 5,950,936.

(30) Foreign Application Priority Data

Nov. 13, 1997 (CA) ................................................. 2221013

(51) Int. Cl.[7] .................................................... B02C 17/22
(52) U.S. Cl. ........................................... 241/99; 241/183
(58) Field of Search .................... 241/99, 183, DIG. 38, 241/182

(56) References Cited

U.S. PATENT DOCUMENTS

| | | | |
|---|---|---|---|
| 3,679,142 | * 7/1972 | Gothard | 241/181 |
| 4,003,164 | * 1/1977 | Carpenter, Jr. et al. | 451/85 |
| 4,069,979 | * 1/1978 | Morita et al. | 241/5 |
| 5,183,213 | 2/1993 | Knez, Jr. | 241/24 |
| 5,595,349 | * 1/1997 | Bergstrom et al. | 241/41 |
| 5,683,041 | * 11/1997 | Sewell et al. | 241/19 |
| 5,938,132 | * 8/1999 | Shinjo et al. | 241/79.1 |

\* cited by examiner

Primary Examiner—John M. Husar
(74) Attorney, Agent, or Firm—Dimock Stratton Clarizio; Mark B. Eisen

(57) ABSTRACT

A system and method for recycling a waste glass cullet includes a first screening station for separating large glass shards of approximately one inch in diameter from smaller glass shards in the cullet, a crusher to reduce the large glass shards to smaller glass shards smaller than approximately one inch in diameter, a second screening station to separate remaining large contaminants having a diameter of approximately one inch or greater from the cullet, a series of vacuum inlets disposed along a conveyor to remove light contaminants, a presoaking apparatus comprising a holding tank partly filled with a presoaking solution, a rotary washing apparatus comprising a drum with vanes disposed along an inner wall of the drum to toss the cullet in the washing solution, the vanes being oriented so that the cullet is tossed progressively forwardly toward a discharge outlet of the drum, to remove buoyant contaminants from the cullet, a dewatering apparatus to remove excess water from the cullet, and a dryer for reducing the moisture content of the cullet. The system and method may further include a second rotary crusher for reducing the cullet size to 12 mesh or smaller and a vibratory multi-deck screen to separate the crushed glass cullet into specified particle sizes. In the preferred embodiment the rotary drum washer for includes a rotating drum having one or more vanes disposed along an inner wall of the drum to toss the cullet in the washing solution, the vanes being oriented so that the cullet is tossed progressively forwardly toward a discharge outlet of the drum.

14 Claims, 8 Drawing Sheets

Process Flow

ROTARY DRUM WASHER

This application is a divisional of application Ser. No. 09/010,033 filed Jan. 21, 1998, U.S. Pat. No. 5,950,936.

FIELD OF THE INVENTION

This invention relates to a system and process for recycling glass. In particular, this invention relates to a system and process for recycling glass cullet to a purity suitable for re-use in industrial applications, requiring only preliminary separation of waste from the cullet prior to recycling.

BACKGROUND OF THE INVENTION

The benefits of recycling materials are well known. Most common household materials, including paper, metals and glass, can be recycled for re-use by industry. However, the cost of recycling varies depending upon the material.

Recycling of glass in particular has been a costly process. The main reason is that industries which use recycled glass require that the glass be largely contaminant free. Household waste recycling programs generally do not discriminate between glass and ceramic recyclables, or between glasses of different colours. As such, glass recyclables collected by recycling authorities tend to be a mixture of different colours of glasses and ceramics, as well as contaminants such as foil or paper labels and any non-recyclable refuse that finds its way into a bottle or jar or other refuse in a recycling bin.

These contaminants present a problem in conventional recycling processes. Prior to the invention there has not been a satisfactory method available for eliminating contaminants such as small paper and foil particles and chemical adhesives from the recycled glass. These contaminants render the recycled glass unsuitable for use in many industrial processes.

Moreover, the ceramic content of the mixture presents a particular problem, because ceramic does not burn off at temperatures which will eliminate most other contaminants and it is often difficult to physically distinguish ceramic from glass so it is virtually impossible to eliminate the ceramic content of the mixture prior to processing. However, recycled glass with any significant content of large ceramic particles is useless to many industries, for example bottle production, because these particles weaken the structure of the recycled product.

As such, existing recycling programs cannot recover much of the glass which is collected for recycling and end up disposing of it in landfill sites with other non-recoverable refuse.

The present invention provides a system and method for recycling glass from a three-mix cullet which includes whole and broken glass recyclables of any colour as well as ceramics and other contaminants. The system and method of the invention requires minimal preliminary separation of materials, saving time and labour costs. The recycled glass cullet is over 99% contaminant free, which is acceptable for use in most industries, and can be produced in a powder form particularly suitable for producing glass fiber insulation, sand blasting slurries, water filtrates, glass beads for reflective paint and many other uses. The recycled glass is also environmentally safe and does not cause silicosis, even in powder form.

The invention accomplishes this by crushing the three mix cullet to a size at which the glass and ceramic can be separated from metal, plastic and other contaminants, washing the resulting mixture in a rotary drum apparatus to remove adhesives and other buoyant or "floatable" contaminants, heating the washed mixture to eliminate any remaining combustibles and reduce moisture content, and optionally further crushing the glass particles to a particle size of minus 12 mesh.

It has been found that ceramics when reduced to a particle size of less than 20 mesh do not adversely affect recycled glass. Ceramic particles of this size dissipate in industrial furnaces and do not form part of the recycled product. Thus, it becomes unnecessary to eliminate ceramics from the recycling mixture, so long as they are crushed to the required size so that they no longer form contaminants in the recycled product. By virtually eliminating contaminants such as paper, foil, ferrous and non-ferrous metals and chemical adhesives, recycled glass produced by the invention is suitable for reuse in most industrial applications which would otherwise be unable to use recycled glass.

The invention further provides a novel glass washing apparatus, comprising a rotating drum having vanes disposed along its interior wall. The drum is composed of sections, each section being supported by rollers and being differentially rotated by a drive mechanism to reduce wear caused by misalignment of the drum on the rollers. As the drum rotates the glass slurry is tossed forwardly by the vanes, and progressively conveyed toward the discharge outlet. The abrasion of the glass particles against the vanes and against neighbouring particles in the presence of the wash solution removes any adhering buoyant contaminants.

The present invention thus provides a system for recycling a waste glass cullet, comprising a first screening station for separating large glass shards of approximately one inch in diameter from smaller glass shards in the cullet, a crusher to reduce the large glass shards to smaller glass shards smaller than approximately one inch in diameter, a second screening station to separate remaining large contaminants having a diameter of approximately one inch or greater from the cullet, a presoak holding tank partially filled with a presoaking solution, a rotary washing apparatus comprising a drum having a vane disposed along an inner wall of the drum to toss the cullet in a washing solution, the vane being oriented so that the cullet is tossed progressively forwardly toward a discharge outlet of the drum, to remove buoyant contaminants from the cullet, a dewatering apparatus to remove excess water from the cullet, and a dryer for reducing the moisture content of the cullet.

The present invention further provides method of recycling a waste glass cullet, comprising the steps of separating large glass shards of approximately one inch in diameter from smaller glass shards in the cullet, crushing the large glass shards to smaller glass shards smaller than approximately one inch in diameter, separating large contaminants having a diameter of approximately one inch or greater from the cullet, presoaking the cullet in a presoaking solution, washing the cullet in a rotary washing apparatus comprising a drum with a vane disposed along an inner wall of the drum to toss the cullet in a washing solution, the vane being oriented so that the cullet is tossed progressively forwardly toward a discharge outlet of the drum, to remove buoyant contaminants from the cullet, dewatering the cullet to remove excess water, and reducing the moisture content of the cullet.

The present invention further provides a rotary drum washer for cleaning a solid material in a washing solution, comprising a rotating drum having an inner wall, a helical vane having an outer edge disposed along the inner wall of the drum and an inner edge remote from the inner wall of the drum, the vane being oriented so that the solid material is tossed progressively forwardly toward a discharge outlet of the drum, and a plurality of radially oriented paddles extending between sections of the vane, each paddle having an outer edge disposed along an inner wall of the drum and an inner edge remote from the inner wall of the drum, wherein the inner edges of at least some of the paddles extend toward an axial center of the drum beyond the inner edge of the vane along substantially an entire length of the paddles.

The present invention further provides a system for recycling glass comprising rotary drum washer for removing buoyant contaminants from glass cullet, the rotary drum washer comprising a rotating drum having an inner wall, a helical vane having an outer edge disposed along the inner wall of the drum and an inner edge remote from the inner wall of the drum, the vane being oriented so that the cullet is tossed progressively forwardly toward a discharge outlet of the drum, and a plurality of radially oriented paddles extending between sections of the vane, each paddle having an outer edge disposed along an inner wall of the drum and an inner edge remote from the inner wall of the drum, wherein the inner edges of at least some of the paddles extend toward an axial center of the drum beyond the inner edge of the vane along substantially an entire length of the paddles.

BRIEF DESCRIPTION OF THE DRAWINGS

In drawings which illustrate by way of example only a preferred embodiment of the invention.

DETAILED DESCRIPTION OF THE INVENTION

Figure 1A:
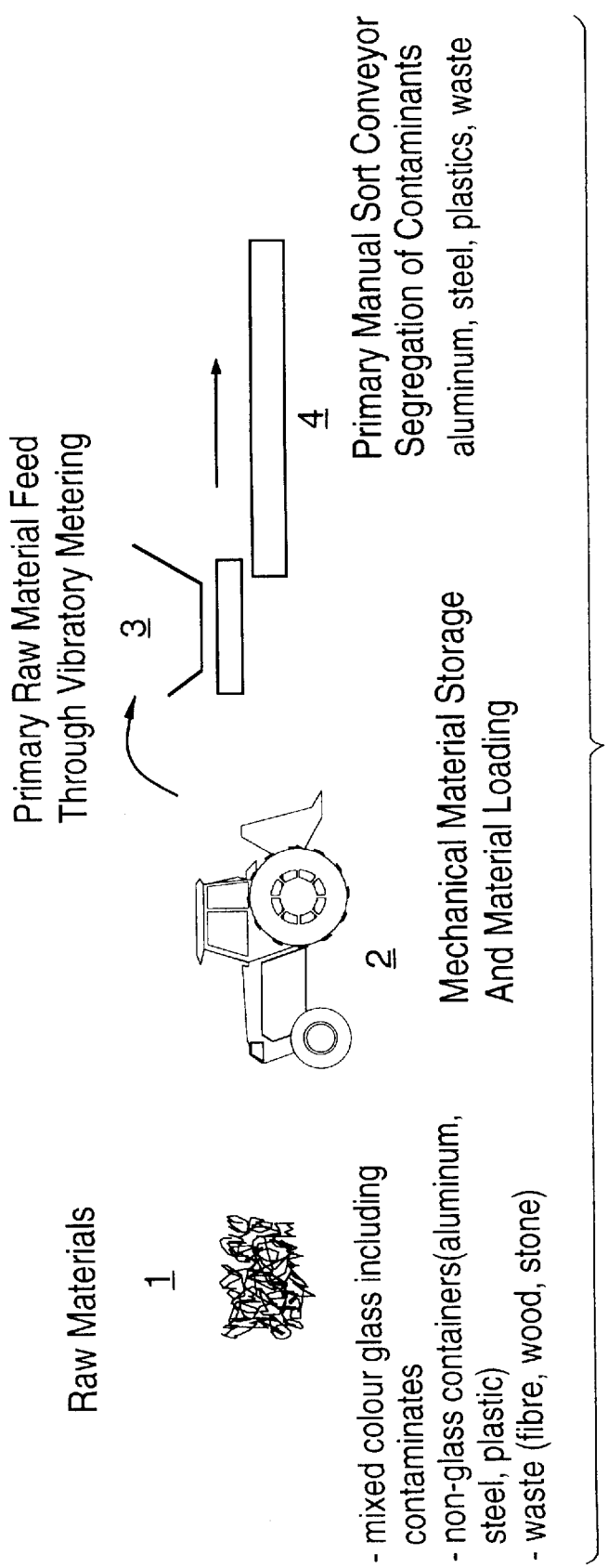
FIGS. 1A, 1B, 1C and 1D are a schematic diagram showing the glass recycling system of the invention.
Figure 1B:
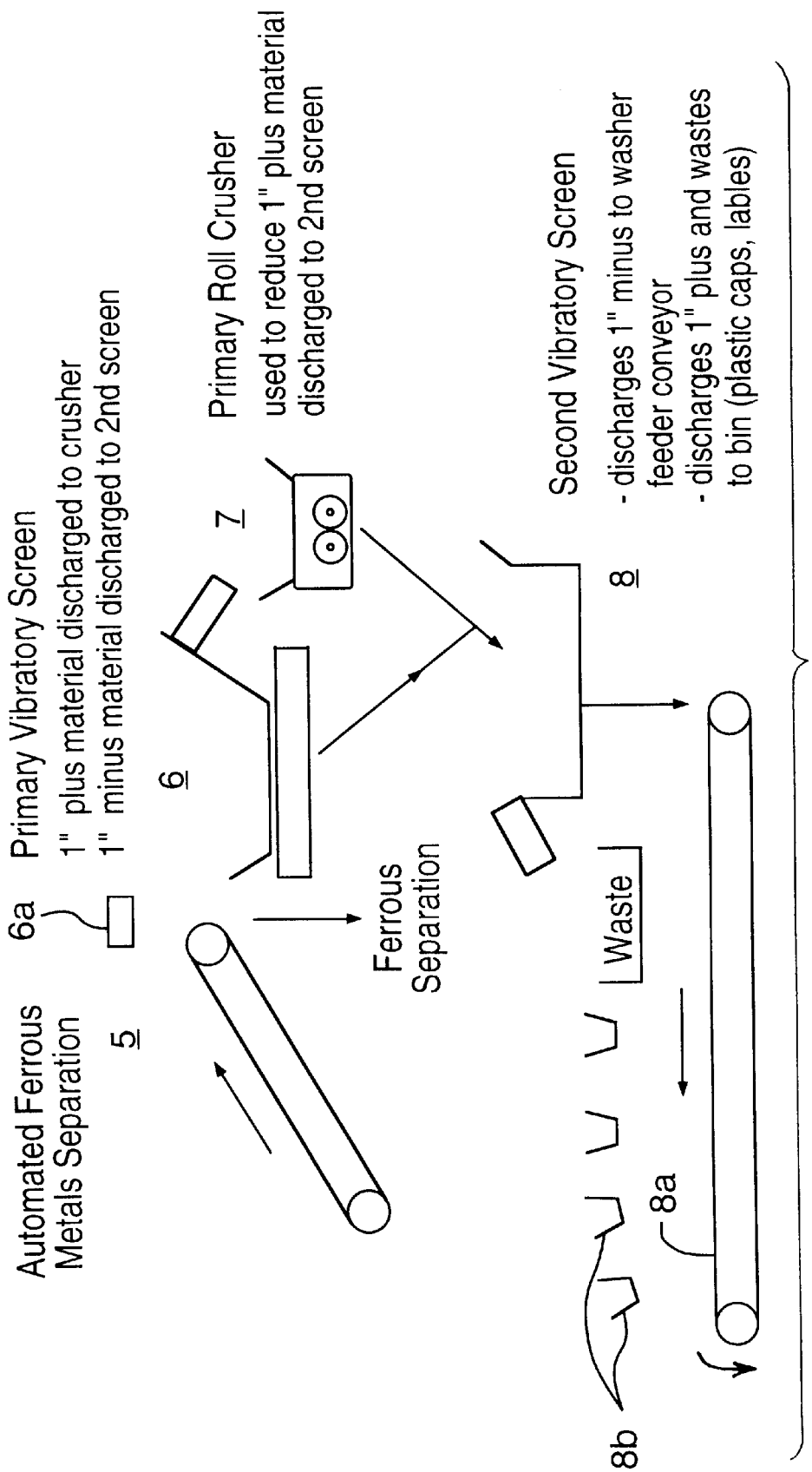
Figure 1C:
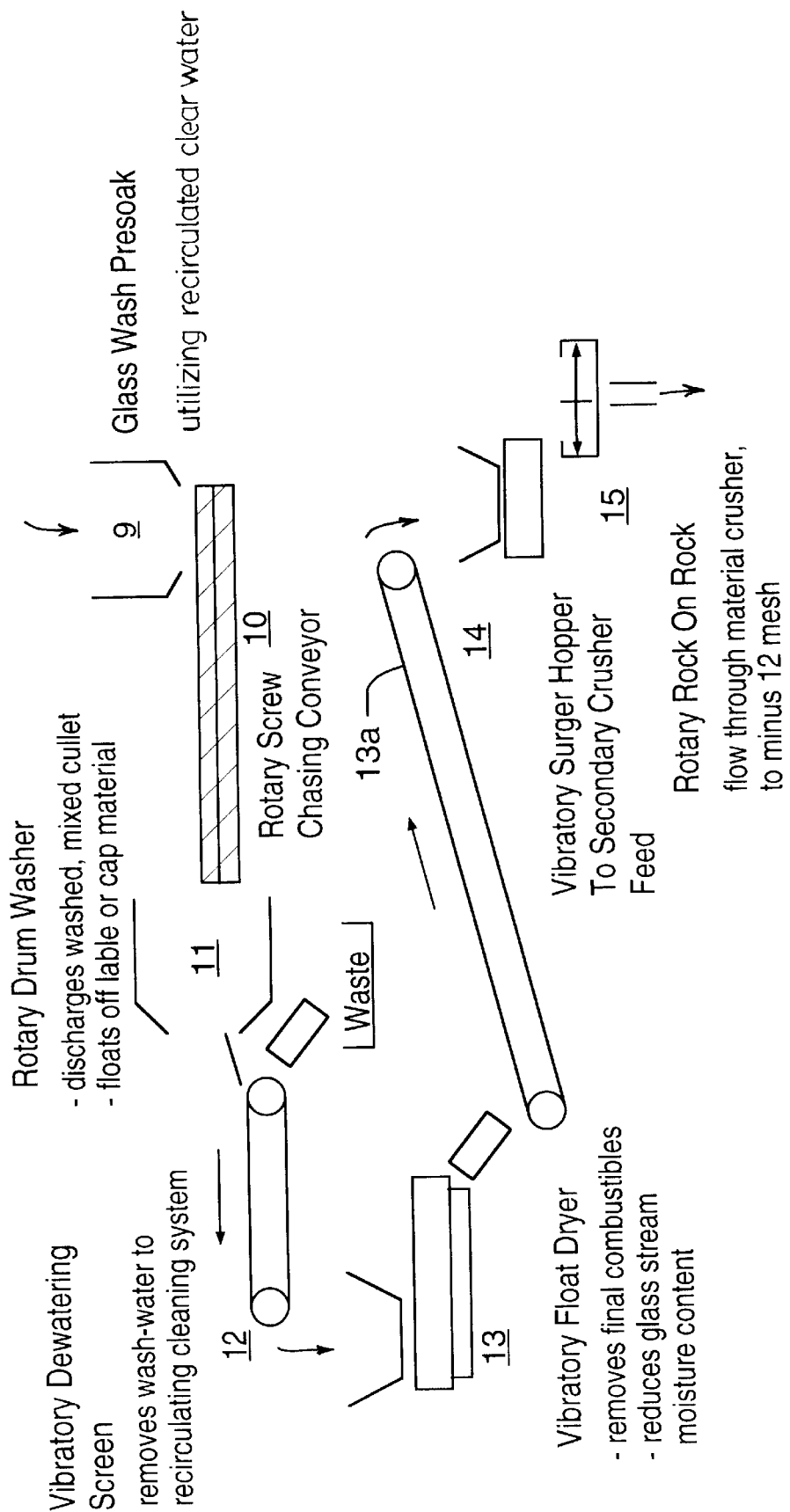
Figure 1D:
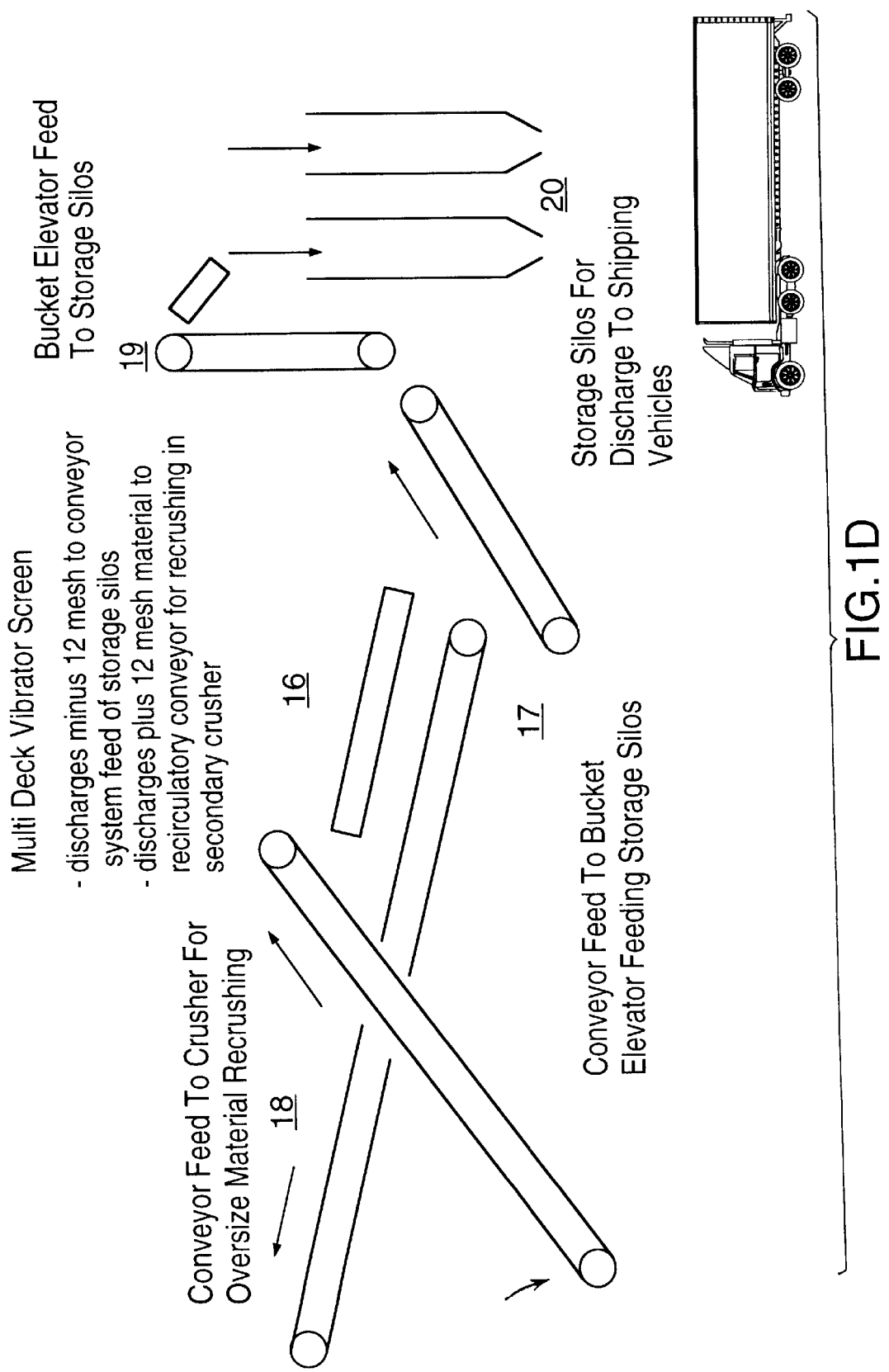

A preferred embodiment of the glass recycling system of the invention is illustrated in FIG. 1. Raw recyclables are collected by civic or other authorities and transported to the recycling plant where they are stored until ready for processing. The recycling system and process comprises the following stages:

a) Feeding of raw material to a manual or mechanical sorting station—The raw recyclables are loaded into a conventional vibratory feeder 3 which feeds the raw material at a selected rate to a manual or mechanical sorting station 4 for separation of large contaminants.

b) Sorting—At the manual or mechanical sorting station 4 large contaminants such as plastic bottles, metal, aluminum, ceramics stones and the like are manually or mechanically removed from the raw mixture and discarded into bins. The remaining three-mix cullet (referring to the three colours of glass in the mixture) is placed onto a conveyor 5 and conveyed to the first screening station 6.

c) First screening—At the first screening station 6 a conventional vibratory screen filter with a 1 inch filter mesh separates large glass shards having a diameter of approximately 1 inch or greater from the mixture. Glass shards and particles smaller than approximately 1 inch drop into a second screening station 8. A magnetic head pulley 6a is preferably provided near the top of the infeed conveyor to the first roll crusher 7, to remove large ferrous contaminants such as bottle caps prior to primary crushing.

d) First crushing—The larger shards having a diameter of 1 inch or greater remaining in the first screening station 6 are fed into a first roll crusher 7 and reduced to shards and particles smaller than 1 inch, which are then deposited into the second screening station 8.

e) Second screening—At the second screening station 8 another conventional vibratory screen filter with a 1 inch filter mesh separates any large contaminants having a diameter of 1 inch or greater from the mixture, such as plastic caps, bottle labels etc. which are not significantly reduced in size by the roll crusher 7. At this stage all particles larger than 1" are contaminants and are discarded into bins.

f) Air vacuuming—Glass shards and particles, and any remaining contaminants smaller than 1 inch, drop onto a second conveyor 8a. Air vacuum inlets 8b disposed at selected points along the conveyor 8a remove any light contaminants (paper, foil etc.) smaller than 1 inch prior to presoaking.

g) Presoaking—The presoak holding tank 30 is partially filled with recirculated filtered water from the washing stage, to which a small amount of fresh water is added to reduce stagnation. A commercially available surfactant cleansing agent is introduced to the holding tank 30 to dissolve glues and foreign compounds adhering to the glass shards prior to the washing stage. An infeed rotary screw conveyor 10, comprising an auger 20 axially disposed within cullet trough 32 similar to the conveyor illustrated in FIG. 5 but oriented horizontally at the base of the presoak holding tank 30, regulates the feed of the glass shards, water and surfactant mixture (washing solution) into the rotary drum washer 11 at a rate controlled by the drum rotation speed.

h) Washing—The washing solution is fed into the holding tank 30 through cullet inlet 32, and drains into the drum 40 along with the glass cullet. As the drum 40 rotates paddles 51 disposed along the inner wall of the drum 40 toss the cullet in the washing solution. Abrasion of the glass particles against the paddles 51 and against neighbouring glass particles in the presence of the surfactant removes any remaining adhering contaminants such as label paper or foil, adhesives, dirt etc. A helical vane 50 is provided along the inner wall of the drum 40 so that the glass mixture is tossed progressively forwardly toward the cullet discharge outlet 44 of the drum 40.

Figure 5:
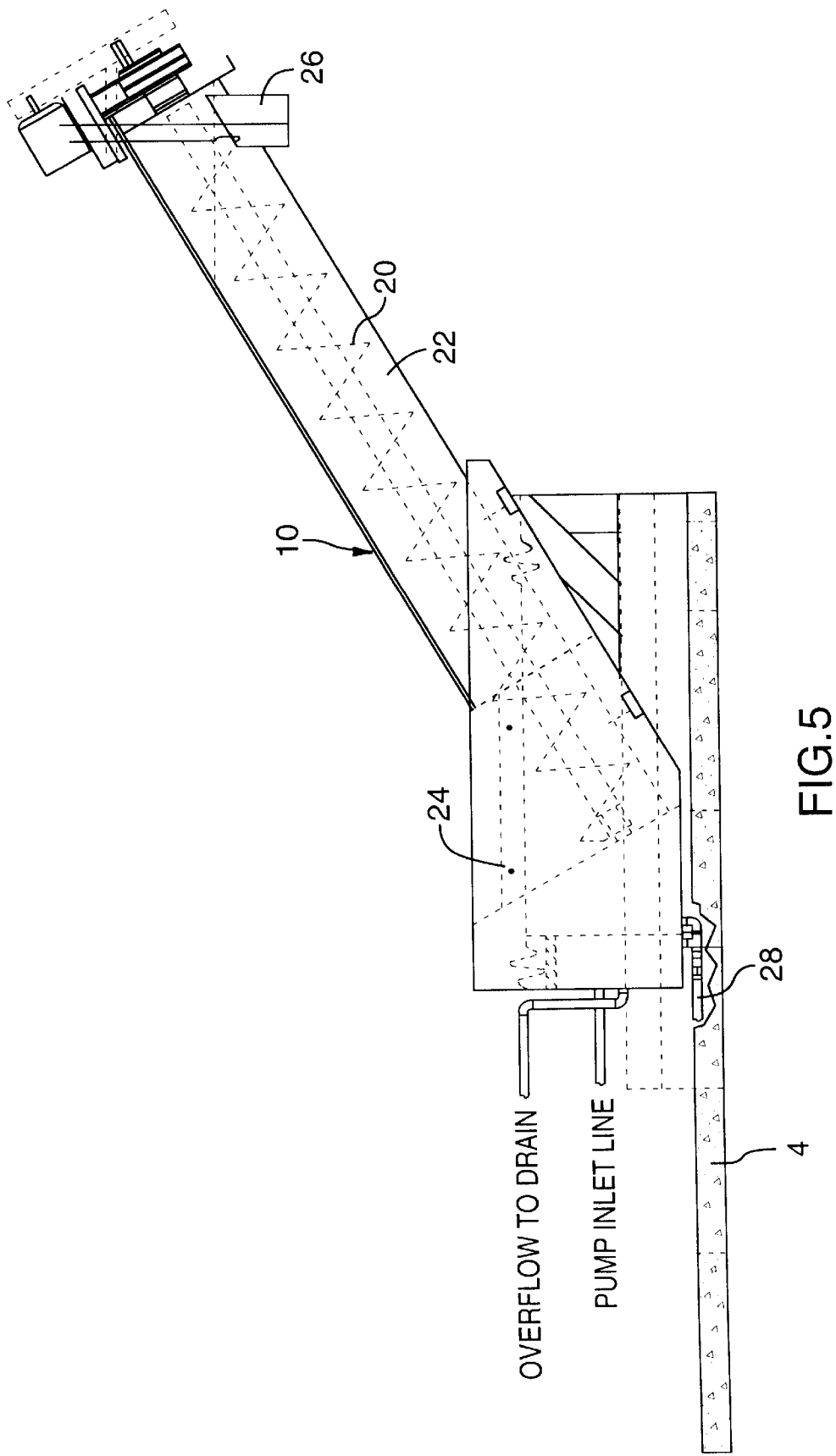
FIG. 5 is a side elevation of a preferred embodiment of a rotary screw conveyor for the system of the invention.

All remaining buoyant or "floatable" contaminants are eliminated during the washing process and are discharged with the washing solution, preferably into a filter unit (not shown) which filters the washing solution for reuse. The glass cullet now consists of cleaned, three-colour glass shards 1 inch or less in diameter.

i) Dewatering—The cleaned glass cullet is discharged from the drum 40 into a vibratory dewatering screen conveyor 12, which removes excess water from the mixture (the water is preferably filtered and recirculated through the rotary drum washer 11). Alternatively, another rotary screw conveyor 10 such as the conveyor 10 illustrated in FIG. 5 can be used to convey the cleaned glass mixture to the dryer 13 for drying. In this embodiment the rotary screw conveyor 10 is preferably inclined upwardly from inlet 24 to outlet 26, as shown in FIG. 5, allowing excess water to flow down the trough 22 toward a water discharge port 28 near the cullet inlet 24.

j) Drying—The dewatered glass cullet is discharged into a hopper feeding a vibrating float dryer 13 which distributes the glass particles evenly on a dryer bed, preferably a "W" shaped dryer bed which allows the heated air blown through the bed to disperse to all surfaces of the glass particles. An example of a suitable dryer 13 is known as a "fluidized bed dryer" made by Carrier Vibrating Equipment Inc. The mixture is dried, preferably to reduce the moisture content to 0.5% or less, and any remaining residue of combustible or flammable particles is burned off and suctioned off by a conventional air vacuum system (not shown) into a suitable commercially available dust collector (not shown).

k) Storage of the recycled glass powder—The cleaned glass cullet is discharged from the vibrator screen 16 to a conveyor 17, which conveys the cullet to a bucket elevator feed 19 for deposit into storage silos 20.

If a fine glass powder is desired, the system and method of the invention may optionally include the following stages:

l) Second crushing—The dried cullet is discharged from the dryer 13 to a conveyor 13a which conveys the cleaned mixture to a vibratory surger hopper 14 that discharges the cullet in metered amounts into a second crusher 15, preferably a rotary rock on rock crusher, which crushes the cullet to a particle size of between plus 12 mesh and minus 12 mesh.

m) Second separation—The crushed cullet may be conveyed to a multi-deck vibrator screen 16 having a plurality of spaced apart minus 12 mesh and smaller filters. Particles of the selected sizes (plus 12 mesh and smaller) are discharged from the vibrator screens 16 to separate conveyors 17, which convey the glass powders to bucket elevator feeds 19 for deposit into storage silos 20 according to particle size.

n) Re-crushing—All particles larger than the desired particle size are discharged from the vibrator screen 16 to a recirculatory conveyor 18 which conveys the cullet back to the rotary rock on rock crusher 15 for further crushing along with the continual discharge of glass cullet from the surger hopper 14.

Figure 2:
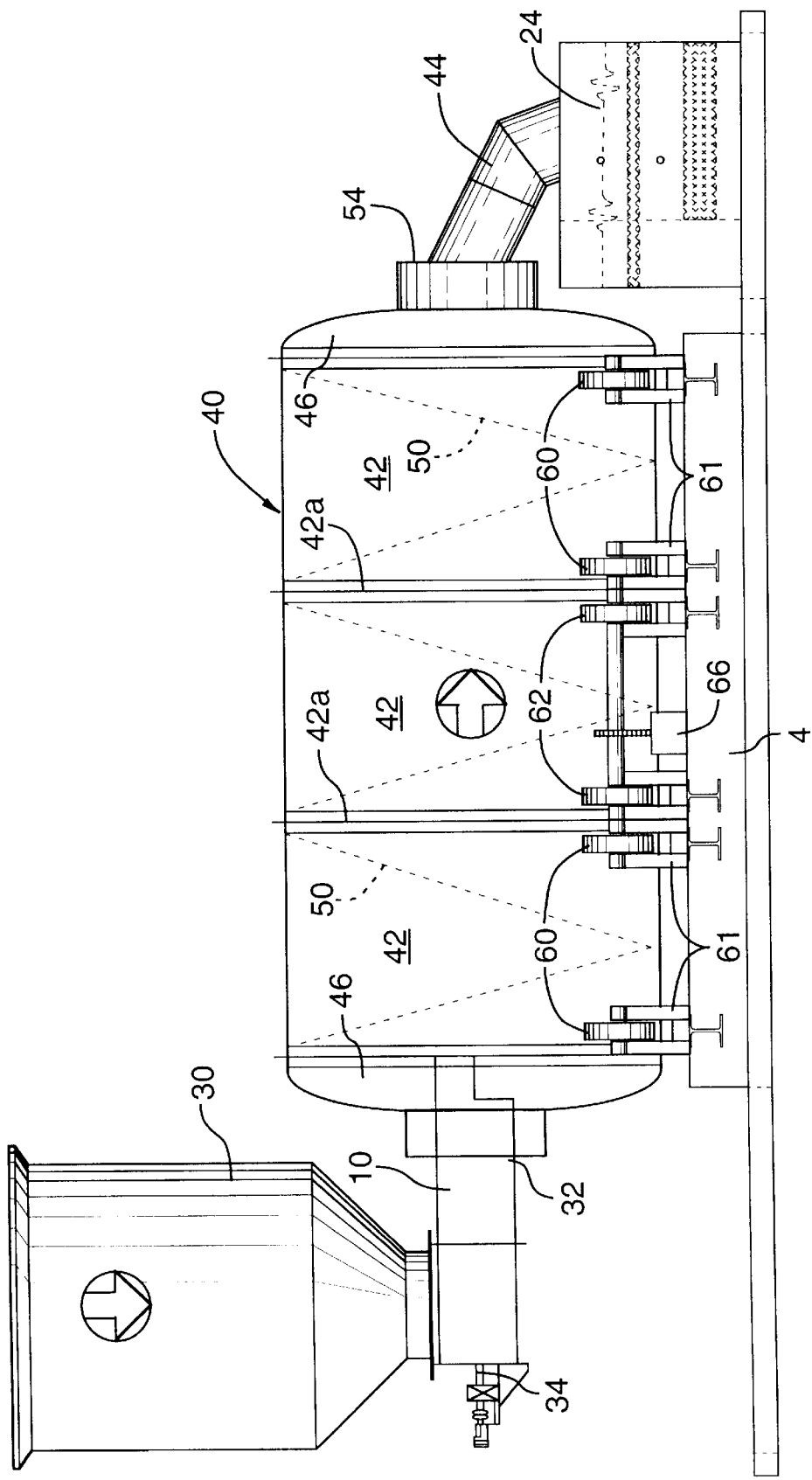
FIG. 2 is a side elevation of a preferred embodiment of the rotary drum washer.
Figure 3:
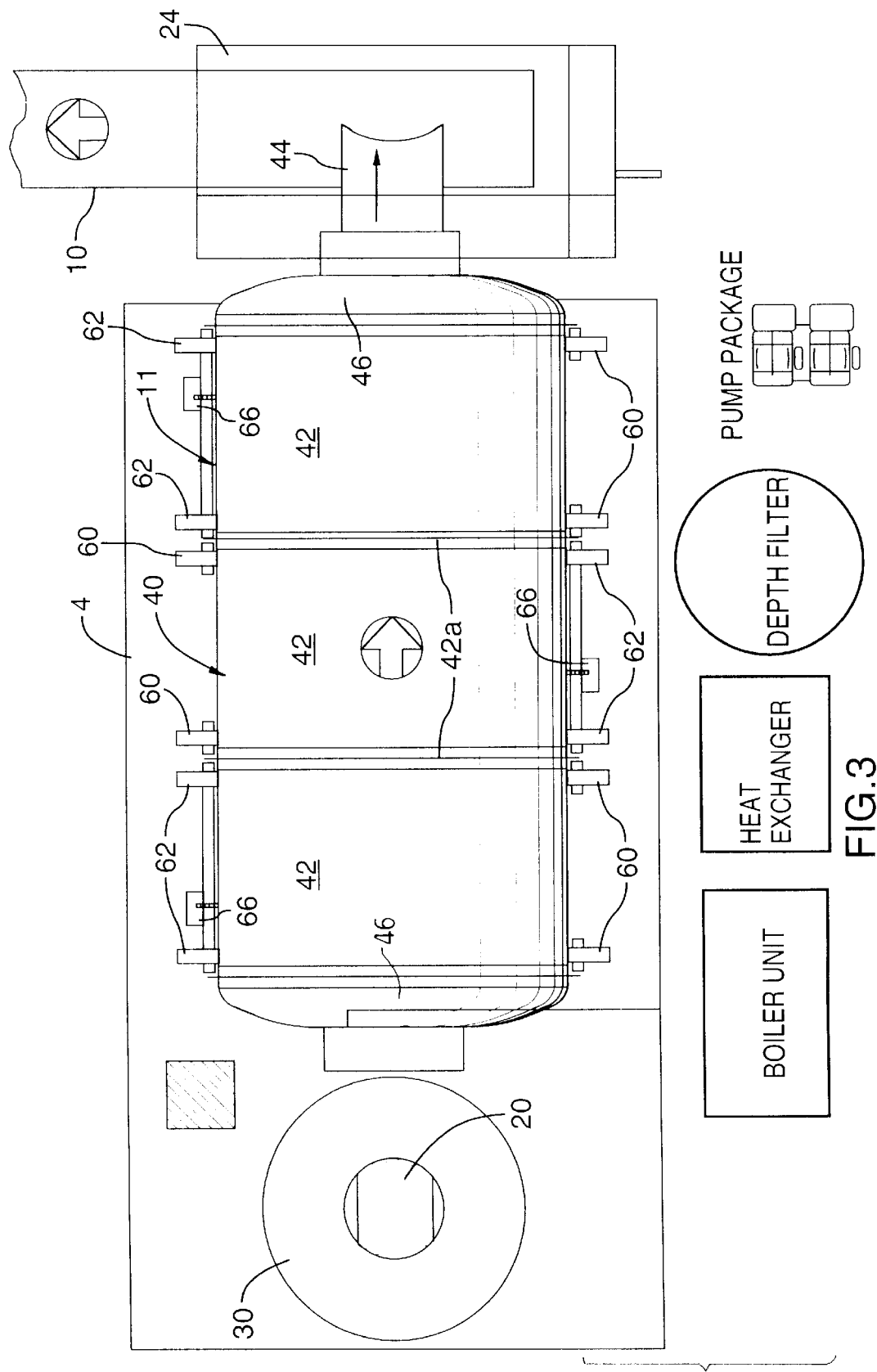
FIG. 3 is a top plan view of the rotary drum washer of FIG. 2.
Figure 4:
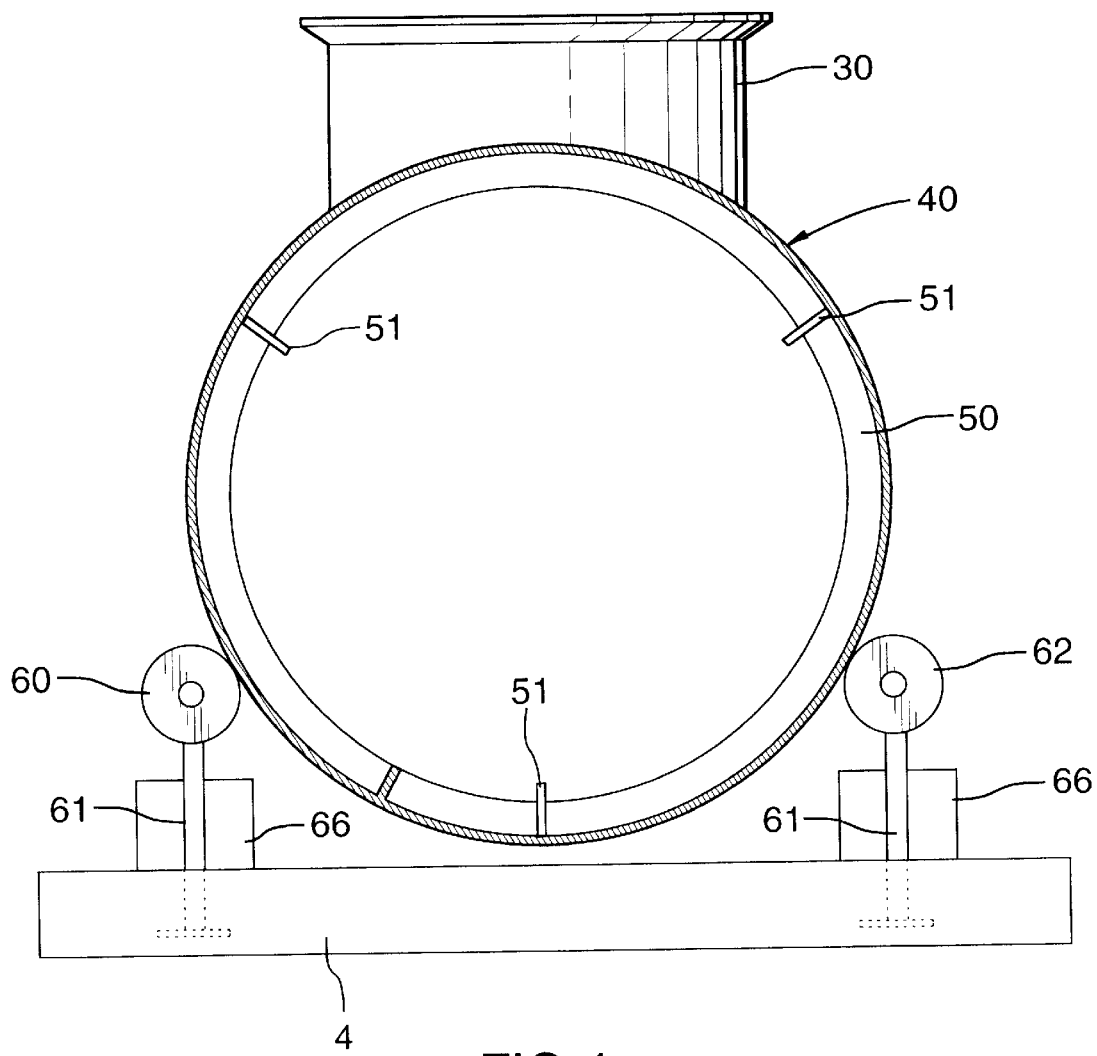
FIG. 4 is a cross-section of the rotary drum washer of FIG. 2.

The rotary drum washer 11, illustrated in FIGS. 2 to 4, comprises a holding tank 30 in communication with a steel drum 40 through a cullet trough 32. The drum 40 is preferably composed of three sections 42 welded together or otherwise suitably joined along seams 42a and welded to ends 46. The sections 42 are each independently supported by sets of free-rolling support rollers 60 and drive rollers 62 disposed near each seam 42a. The rollers 60, 62 are mounted on posts 61 embedded in the concrete slab floor 4. Preferably a separate hydraulic drive unit 66 drives each set of drive rollers 62 independently, as shown in FIGS. 2 and 3, reducing wear on the rollers 60, 62 caused by normal misalignment of the drum sections 42 and undulation during use.

The washing solution is pumped into the holding tank 30 through fluid inlet 34, and drains into the drum 40 through the cullet inlet 32. A helical stainless steel vane 50 is disposed along the inner wall 40a of the drum 40, as shown in phantom in FIG. 2, so that as the drum 40 rotates the cullet migrates progressively forwardly toward the outlet 44. The rotary speed of the drum 40 thus determines the duration of the washing cycle, which can be adjusted depending upon the desired recycling capacity, surfactant concentration and water temperature to ensure that the cullet is substantially cleaned of contaminants before egressing from the drum 40.

The interior of the drum 40 further includes a series of generally rectangular paddles 51 oriented radially, preferably every 120° along the vane 50, as shown in FIG. 4, so that as the drum 40 rotates the cullet is tossed in the washing solution and drops back to the level of the washing solution as each paddle 51 approaches the top of the rotational cycle of the drum 40.

The helical vane 50 has an outer edge disposed along the inner wall of the drum 40 and an inner edge remote from the inner wall of the drum 40. The plurality of radially oriented paddles 51 extend between sections of the vane 50, and each paddle 51 has an outer edge disposed along an inner wall of the drum and an inner edge remote from the inner wall of the drum 40, whereby the inner edges of at least some of the paddles 51 extend toward an axial center of the drum beyond the inner edge of the vane along substantially the entire length of the paddles 51.

The "floatable" contaminants, including paper and foil label particles and adhesive residues, float to the top of the solution and are discharged with the solution through annular water discharge outlet 54 surrounding the cullet outlet 44, preferably into a filter apparatus (not shown) which cleans the solution for reuse in the washing and presoaking stages.

The washed cullet retains its ceramic content. To render the cullet suitable for use in industries which require that the ceramics be eliminated, the second crushing stage described above is employed to produce a fine glass powder. The fine ceramic particles dispersed throughout the glass powder will dissipate in further processing.

A preferred embodiment of the invention having been thus described by way of example only, it will be apparent to those skilled in the art that certain modifications and adaptations may be made without departing from the scope of the invention, as set out in the appended claims.

What is claimed is:

1. A rotary drum washer for cleaning a solid material in a washing solution, comprising a rotating drum having an inner wall, a helical vane having an outer edge disposed along the inner wall of the drum and an inner edge remote from the inner wall of the drum, the vane being oriented so that the solid material is tossed progressively forwardly toward a discharge outlet of the drum, and a plurality of radially oriented paddles extending between sections of the vane, each paddle having an outer edge disposed along an inner wall of the drum and an inner edge remote from the inner wall of the drum, wherein the inner edges of at least some of the paddles extend toward an axial center of the drum beyond the inner edge of the vane along substantially an entire length of the paddles.

2. The rotary drum washer of claim 1 in which the radially oriented paddles are disposed circumferentially approximately 120 degrees apart.

3. The rotary drum washer of claim 1 comprising an inlet at one end thereof.

4. The rotary drum washer of claim 3 comprising a fluid outlet at an opposite end thereof.

5. The rotary drum washer of claim 4 in which the vane extends substantially between the fluid inlet and the fluid outlet.

6. The rotary drum washer of claim 3 in which the inlet is in communication with a hopper.

7. The rotary drum washer of claim 6 for washing a glass cullet.

8. The rotary drum washer of claim 1 in which the drum is rotated by external rollers in communication with a drive mechanism and with an exterior wall of the drum.

9. A system for recycling glass comprising rotary drum washer for removing buoyant contaminants from glass cullet, the rotary drum washer comprising a rotating drum having an inner wall, a helical vane having an outer edge disposed along the inner wall of the drum and an inner edge remote from the inner wall of the drum, the vane being oriented so that the cullet is tossed progressively forwardly toward a discharge outlet of the drum, and a plurality of radially oriented paddles extending between sections of the vane, each paddle having an outer edge disposed along an inner wall of the drum and an inner edge remote from the inner wall of the drum, wherein the inner edges of at least some of the paddles extend toward an axial center of the drum beyond the inner edge of the vane along substantially an entire length of the paddles.

10. The system for recycling glass of claim 9 in which the radially oriented paddles are disposed circumferentially approximately 120 degrees apart.

11. The system for recycling glass of claim 9 in which the rotary drum washer comprises an inlet at one end thereof.

12. The system for recycling glass of claim 11 in which the rotary drum washer comprises a fluid outlet at an opposite end thereof.

13. The system for recycling glass of claim 12 in which the vane extends substantially between the fluid inlet and the fluid outlet.

14. The system for recycling glass of claim 11 in which the inlet is in communication with a hopper.

* * * * *